United States Patent [19]

Kawahara et al.

[11] Patent Number: 5,395,669
[45] Date of Patent: Mar. 7, 1995

[54] OPTICAL RECORD MEDIUM

[75] Inventors: Katsumi Kawahara, Kadoma; Takeo Ohta, Nara; Shigeaki Furukawa, Shiki; Tetsuya Akiyama, Habikino, all of Japan

[73] Assignee: Matsushita Electric Industrial Co., Ltd., Osaka, Japan

[21] Appl. No.: 67,132

[22] Filed: May 26, 1993

[51] Int. Cl.$^6$ .............................................. B32B 3/00
[52] U.S. Cl. ........................................ 428/64; 428/65; 428/457; 428/448; 428/913; 430/270; 430/945; 346/135.1; 347/264
[58] Field of Search ................... 428/64, 65, 457, 448, 428/913; 430/945, 270; 346/76, 135.1

[56] References Cited

U.S. PATENT DOCUMENTS

| | | | |
|---|---|---|---|
| 4,984,231 | 1/1991 | Yasuoka et al. | 428/64 |
| 5,024,910 | 6/1991 | Ohta | 428/64 |
| 5,063,097 | 11/1991 | Hirota | 428/64 |
| 5,075,145 | 12/1991 | Yamamoto | 428/64 |
| 5,147,701 | 9/1992 | Furukawa et al. | 430/270 |
| 5,154,957 | 10/1992 | Yamada | 428/64 |
| 5,171,618 | 12/1992 | Suzuki | 428/64 |
| 5,234,737 | 8/1993 | Ueno et al. | 428/64 |
| 5,238,722 | 8/1993 | Yashiro et al. | 428/64 |

FOREIGN PATENT DOCUMENTS

| | | |
|---|---|---|
| 0516178 | 12/1992 | European Pat. Off. . |
| 63020742 | 1/1988 | Japan . |
| 2139728 | 5/1990 | Japan . |
| 3168945 | 7/1991 | Japan . |
| 3232133 | 10/1991 | Japan . |

OTHER PUBLICATIONS

SPIE–The International Society for Optical Engineering, Optical Data Storage Topical Meeting, vol. 1078, Jan. 17–19 1989, pp. 27–34.
Database WPI, Section EI, Derwent Publications Ltd., Class TO3 AN 93-170065 and JP-A-5 101 442 (Fuji Xerox Co., Ltd.) Abstract.

*Primary Examiner*—Patrick J. Ryan
*Assistant Examiner*—Elizabeth Evans
*Attorney, Agent, or Firm*—Willian Brinks Hofer Gilson & Lione

[57] ABSTRACT

In a record medium wherein information is recorded and/or erased by changing the optical state thermally by the irradiation with a laser beam or the like, a protection layer made from a material having a larger thermal conductivity than adjacent protection layers is used to decrease the temperature difference between the center and edges of a record mark on recording and/or erasing with a laser beam. By using the material having a larger thermal conductivity, the heat due to the irradiation with a laser beam or the like is diffused not only to the periphery of the substrate, but also to the plane of the substrate surely. Therefore, the temperature difference between the center and the edges in a mark on irradiation with the laser beam is decreased, and the recording/erasing characteristics and the power margin for erasing can be improved.

17 Claims, 4 Drawing Sheets

5,395,669

OPTICAL RECORD MEDIUM

BACKGROUND OF THE INVENTION

1. Field of the Invention

The present invention relates to an optical record medium which can record or erase information of a large capacity at a high density with use of a laser beam or the like.

2. Description of the Prior Art

A write-once type disk is known as an optical record memory, and it comprises a material which can transform from the crystalline phase to the amorphous phase such as $TeO_x$ ($0 < X < 2.0$) having Te and $TeO_2$ as main components. In such an optical record memory, a data is written thermally by irradiating the optical disk with a laser beam or the like.

Further, a write erasable disk wherein information can be recorded and erased repeatedly has also been used practically as an optical record memory. Such a write erasable disk can record information by changing a mark point in a record thin film to the amorphous state with a laser beam to heat, melt and cool rapidly the record thin film, while it can erase information by changing a mark point in the record thin film to the crystalline state with a laser beam to heat and cool gradually the record thin film. Materials which can transform reversibly between the crystalline phase and the amorphous state are used for such a record thin film, and they include a chalcogenide material $Ge_{15}Te_{81}S_2$ by S. R. Ovshinsky and the like, and $As_2S_3$, $As_2Se_3$, $Sb_2Se_3$ and the like which are combinations of a chalcogen element with another element in group V such as As or in group IV such as Ge in the periodic table. An optical disk can be produced by forming such a record thin film on a substrate having grooves for guiding a laser beam. In order to record or erase information in such an optical disk with a laser beam, the record thin film is crystallized at first. Then, the intensity of a laser beam focussed at diameter of about 0.5 μm on the rotated disk is modulated for irradiation in correspondence to information, so that the temperature of a point irradiated with the laser beam at a peak power is increased above the melting point of the record thin film and is cooled rapidly. Thus, the information is recorded as an amorphous mark. Further, the temperature of a point irradiated at a bias peak power rises above the crystallization temperature of the record thin film, so that the information recorded previously can be erased or an overwrite is possible.

As explained above, the temperature of the record thin film can be risen with a laser beam above the melting point or above the crystallization point. Therefore, heat-resistant dielectric layers are generally provided above and below the record thin film as protection layers for the substrate and for an adhesive layer. Because the characteristics of temperature rise, rapid cooling and gradual cooling vary with the thermal conduction characteristic of the protection layers, the recording and erasing characteristics depend on the materials selected for the protection layers.

As shown in FIG. 1, grooves 31 are provided in an optical disk and record marks 30 are formed along the grooves with a laser beam thermally. In the above-mentioned optical disks of the write erasable type and of the write once type, information can be recorded by rising the temperature of the record thin film above the melting point to transform the record thin film to the amorphous phase and by cooling the record thin film rapidly. On irradiation of a laser beam along a groove 31 to form a record mark 30, a temperature difference exists between the center line 32 and an edge 33 in a groove 31 in the groove 30. Then, if the power of the laser beam for erasing is small, the temperature of the edges 33 may not rise above the melting point and the edges 33 may be remained not to be transformed in the amorphous state. Then, a large recording power is needed for recording a mark, and the sensitivity of optical disk becomes worse.

Further, in a write erasable optical disk, information can be erased by rising the temperature above the crystallization temperature. If the power of the laser beam for erasing is small, the temperature of the edges 33 may not rise above the crystallization point and the edges 33 may be remained not to be erased. If the erasing power is increased for erasing the record mark 30 completely, the temperature difference increases and the temperature of the center line 32 increases. Thus, it is a problem that the margin of erasing power becomes narrow.

SUMMARY OF THE INVENTION

An object of the present invention is to provide an optical disk having improved recording and/or erasing characteristics.

In an aspect of the present invention, an optical record medium comprises a first protection film, a second protection film, a third protection film, a recording thin film, a fourth protection film, a fifth protection film, a sixth protection film and a reflection layer, these layers being applied to a plane of a transparent substrate successively. The second and fifth protection films are made from a material having a larger thermal conductivity than that of the adjacent protection films. Either of the second and fifth protection films may be omitted. The protection films having a larger thermal conductivity are used to decrease a temperature difference between the center and an edge of a mark on irradiation of laser beam or the like. In other words, the heat due to the irradiation with a laser beam or the like is diffused not only to the periphery of the substrate, but also to the plane of the substrate surely. Because the temperature difference between the center and an edge of a record mark decreases, the recording/erasing characteristics and the power margin for erasing can be improved and an optical record medium has a stable characteristic and a wider erasing power margin.

An advantage of the present invention is to provide an optical disk having an improved recording characteristic.

Another advantage of the present invention is to provide an optical disk having a large erasability and a wide erasing power margin.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
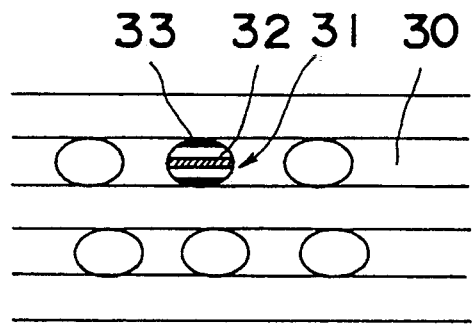
FIG. 1 is a partial schematic view of an optical information record medium.

Referring now to the drawings, wherein like reference characters designate like or corresponding parts throughout the several views, embodiments of the present invention will be explained below.

Embodiment 1

Figure 2:
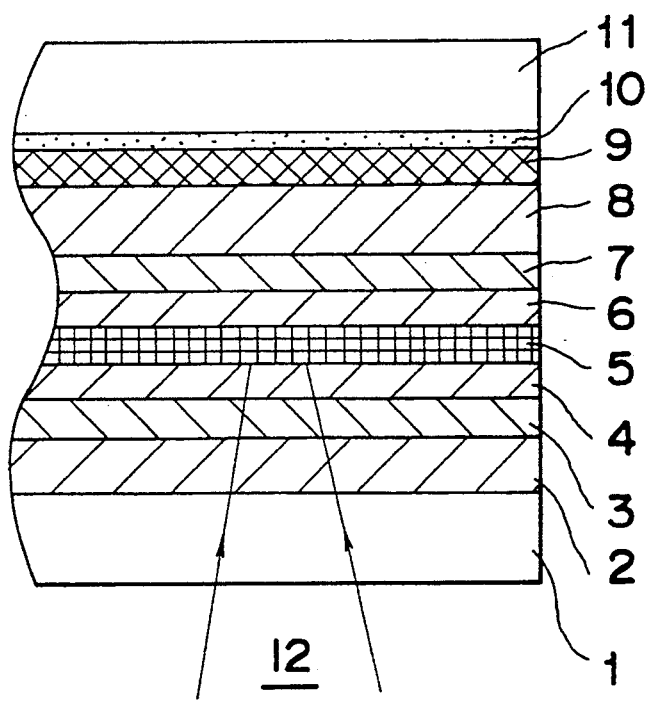
FIG. 2 is a partial sectional view of an optical information record medium of a first embodiment of the present invention.

FIG. 2 shows a write erasable disk of a first embodiment of the present invention schematically, wherein a reference numeral 1 denotes a disk substrate made of polycarbonate resin. The disk substrate 1 may be a resin substrate having grooves for guiding a laser beam, a glass substrate having grooves formed with the photo-polymerization process or a substrate having grooves formed directly on a glass plate. A reference numeral 2 denotes a first protection layer of about 70 nm thickness made of a dielectric material of a mixture of ZnS and $SiO_2$. A reference numeral 3 denotes a second protection layer of about 40 nm thickness made of a material $SiO_2$ having a higher thermal conductivity than the first protection layer and a third one. A reference numeral 4 denotes the third protection layer of about 5 nm thickness made of a dielectric material of a mixture of ZnS and $SiO_2$. A reference numeral 5 denotes a record thin film made of a Te—Ge—Sb alloy. Its composition has "g"=2.0 and "b"=0 wherein "g" denotes the mol ratio of $GeTe/Sb_2Te_3$ and "b" denotes the mol ratio of $Sb/Sb_2Te_3$, that is, the composition is $(GeTe)_2(Sb_2Te_3)$. The thickness of the record thin film 5 is about 45 nm. A reference numeral 6 denotes a fourth protection layer of about 5 nm thickness made of a dielectric material of a mixture of ZnS and $SiO_2$. A reference numeral 7 denotes a fifth protection layer of about 40 nm thickness made of a material $SiO_2$ having a higher thermal conductivity than the fourth protection layer and a sixth one. A reference numeral 8 denotes the sixth protection layer of about 170 nm thickness made of a dielectric material of a mixture of ZnS and $SiO_2$. A reference numeral 9 denotes a reflection layer of about 60 nm thickness made of aluminum. A reference numeral 11 denotes a protection plate made of polycarbonate resin and it is adhered to the disk substrate 1 with an adhesive layer 10. A reference numeral 12 denotes a direction of laser beam.

A ratio of $SiO_2$ in the $ZnS$—$SiO_2$ mixture films as the first, third, fourth and sixth protection layers 2, 4, 6, 8 is selected to be 20 mol %. In general, $ZnS$—$SiO_2$ films are prepared with vacuum deposition or sputtering, and sputtering is used in the present and other embodiments.

In the structure illustrated in FIG. 2, recording, erasing and reproduction are performed by irradiating the record thin film 5 with a laser beam 12 in the direction of the arrow 12 at an intensity of the laser beam modulated in accordance to the data on recording, erasing and reproduction and by detecting the reflection light. In the optical disk, appropriate modulation values are realized for a difference of the reflection light between different states, for a change in reflectance and for a difference of absorption rate between a non-recorded region (usually in the crystalline state) and a record mark region (usually in the amorphous state). The absorption rate of the crystalline state is 71.8%, while that of the amorphous state is 70.3%. Further, the difference of reflectance is 17.2%.

The overwrite characteristic of the disk of the present embodiment of 130 mm of outer diameter is measured at 4,930 rpm of revolution for signals of f1=15 MHz and f2=5.63 Mhz. An overwrite is performed with a laser beam of a circle spot of about 1 μm by modulating between a high power level of 22–24 mW and a low power level of 9–13 mW. The recording and erasing are performed with an overwrite process, that is, an amorphous mark is formed at the high power level, while a crystalline mark is formed at the low power level. The result shows that the C/N (carry-to-noise) ratio of record signal is 50 dB or larger. As to the erasing characteristic, erasing cycle characteristic of 100,000 times or more can be realized for the erasability of 24 dB or larger. These data means that the optical disk can be used practically. Further, the wide erasing power margin is realized.

The composition of the record thin film 5 may have a following value of "g" which denotes the mol ratio of $GeTe/Sb_2Te_3$: $1.0 \leq g \leq 2.5$; and a following value of "b" which denotes the mol ratio of $Sb/Sb_2Te_3$: $0.0 \leq b \leq 0.5$.

Further, the thickness of the record thin film 5 is selected between about 30 and 50 nm. If the thickness is smaller than 30 nm, the signal amplitude becomes small, while if the thickness is larger than 50 nm, the sensitivity of the disk becomes low because the laser power to heat the thin film 5 for the phase transformation has to be enhanced.

The thicknesses of the second and fifth protection layers 3, 7 are selected between 30 and 50 nm. If the thickness is smaller than 30 μm, the heat is hard to be diffused in the plane directions and an advantage to diffuse heat in the plane directions becomes smaller. If the thickness is thicker than 50 μm, the protection layers 3, 7 are cooled too rapidly and the laser power has to be increased.

The second and fifth protection layers 3 and 7 made of a material having a larger thermal conductivity may be made of AlN, $Al_2O_3$, SiC or $Ta_2O_5$ other than $SiO_2$.

The mol ratio of $SiO_2$ in the $ZnS$—$SiO_2$ mixture films of the first, third, fourth and sixth protection films 2, 4, 6, 8 is selected between 5 and 40%. If the mol ratio is smaller than 5%, an advantage of the mixing to decrease grain sizes becomes small, and a bad influence of noises increases. If the mol ratio is larger than 40%, the thermal conductivity increases and the laser power for the phase transformation has to be enhanced or the sensitivity of the optical disk becomes worse.

The thicknesses of the third and fourth protection layers are selected between 2 and 10 nm. If the thickness is smaller than 2 nm, heat diffuses excessively in plane directions and this deteriorates the action of the second and fifth protection layers to diffuse heat in plane directions. On the other hand, if the thickness is larger than 10 nm, the laser power for melting the record thin film has to be increased or the sensitivity of the optical disk becomes low.

The total sum of the thicknesses of the first, second and third protection layers 2, 3, 4 is selected between 105 and 130 nm, in order to realize that the optical absorption rate in the crystalline and amorphous states is 60% or more and that a difference of the reflectance between the two states is 15% or more. The total sum of the thicknesses of the fourth, fifth and sixth protection layers 6, 7, 8 is selected between 150–250 nm according to the same reason.

Embodiment 2

Figure 3:
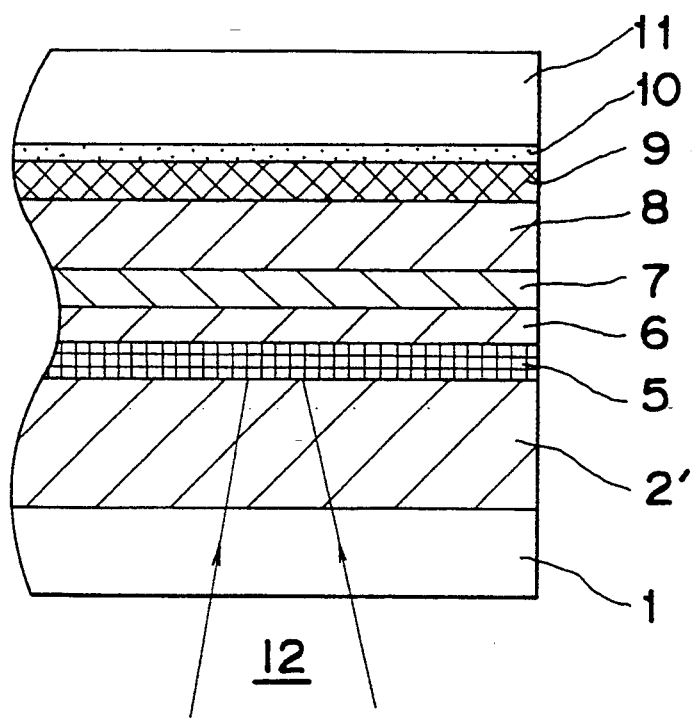
FIG. 3 is a partial sectional view of a second embodiment of an optical information record medium.

Further, even if either of the second or fifth protection layer 3, 7 is omitted, a similar advantage can be obtained. FIG. 3 shows a case wherein the second protection layer 3 is omitted. The structure shown in FIG. 3 is the same as that shown in FIG. 2 except that a first protection layer 2' of about 110 nm thickness replaces the first to three protection layers 2–4.

In the structure illustrated in FIG. 3, the absorption rate of the crystalline state is 71.8% while that of the amorphous state is 70.3%. Further, the difference of reflectance is 17.2%.

The ratio of $SiO_2$ in the $ZnS$—$SiO_2$ mixed film as the first protection layer 2' is selected to be 20 mol %.

The thickness of the first protection layer 2' is selected between 105 and 130 nm, in order to realize that the optical absorption rate in the crystalline and amorphous states is 60% or more and that a difference of the reflectance between the two states is 15% or more.

The overwrite characteristic of the disk of the present embodiment of 130 mm of outer diameter is measured similarly to that in Embodiment 1. The result shows that the C/N ratio of record signal is 50 dB or larger. As to the erasing characteristic, erasing cycle characteristic of 100,000 times or more can be realized for the erasability of 24 dB or larger. Further, the erasing power margin is realized to be wide.

Embodiment 3

Figure 4:
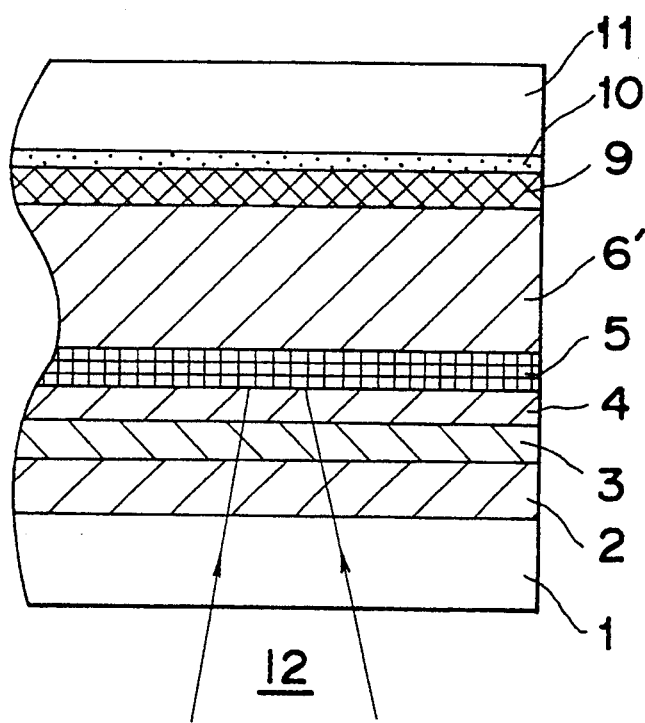
FIG. 4 is a partial sectional view of a third embodiment of an optical information record medium.

Further, FIG. 4 shows a case wherein the fifth protection layer 7 is omitted. The structure shown in FIG. 4 is the same as that shown in FIG. 2 except that a fourth protection layer 6' of about 220 nm thickness replaces the fourth to sixth protection layers 6–8.

In the structure illustrated in FIG. 4, the absorption rate of the crystalline state is 71.8% while that of the amorphous state is 70.3%. Further, the difference of reflectance is 17.2%.

The ratio of $SiO_2$ in the $ZnS$—$SiO_2$ mixed film as the fourth protection layer 6' is selected to be 20 mol %.

The thickness of the fourth protection layer 6' is selected between 150 and 250 nm, in order to realize that the optical absorption rate in the crystalline and amorphous states is 60% or more and that a difference of the reflectance between the two states is 15% or more.

The overwrite characteristic of the disk of the present embodiment of 130 mm of outer diameter is measured similarly to that in Embodiment 1. The result shows that the C/N ratio of record signal is 50 dB or larger. As to the erasing characteristic, erasing cycle characteristic of 100,000 times or more can be realized for the erasability of 24 dB or larger. Further, the erasing power margin is realized to be wide.

The above-mentioned embodiments relate to a write erasable optical disk. However, a write-once type disk having structures illustrated in FIGS. 2–4 can also be made similarly. A record thin film 5 may be made from for example $TeO_x$ ($0 < X < 2.0$) having Te and $TeO_2$ as main components while protection layers 3, 7 may be made of $SiO_2$, AlN, $Al_2O_3$, SiC or $Ta_2O_5$ having a larger thermal conductivity than adjacent protection layers 2, 4, 6 and 8. Thus, the thermal conductance characteristic of protection layers is improved, so that the recording characteristic is improved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical record medium comprising:
    a first protection film applied to a surface of a transparent substrate;
    a record film applied to said first protection film, said record film being able to be transformed from an amorphous state to a crystalline phase with radiation;
    a fourth protection film applied to said record film;
    a reflection layer applied to said fourth protection film;
    said optical record medium further comprising: a first pair of a second protection film applied to said first protection film and a third protection film applied to said second protection film, said first pair being interposed between said first protection film and said record film; or
    a second pair of a fifth protection film applied to said fourth protection film and a sixth protection film applied to said fifth protection film, said second pair being interposed between said fourth protection film and said reflection layer;
    wherein said first, third, fourth and sixth protection films are made of a mixture of ZnS and $SiO_2$ and said second or fifth protection film is made from a material having a larger thermal conductivity than those of said first, third, fourth and sixth protection films.

2. The optical record medium according to claim 1, wherein said second or fifth protection films having the larger thermal conductivity are made from at least one material selected from the group consisting of $SiO_2$, AlN, $Al_2O_3$, $Si_3N_4$, $SiC_3$ and $Ta_2O_5$.

3. The optical record medium according to claim 1, wherein the thickness of said second or fifth protection film is selected between 30 and 50 nm.

4. The optical record medium according to claim 1, wherein the total sum of the thicknesses of said first, second and third protection films is selected between 105 and 130 nm.

5. The optical record medium according to claim 1, wherein the thicknesses of said third and fourth protection films are selected between 2 and 10 nm.

6. The optical record medium according to claim 1, wherein the total sum of the thicknesses of said fourth, fifth and sixth protection films is selected between 150 and 250 nm.

7. The optical record medium according to claim 1, wherein a ratio of $SiO_2$ to ZnS in said first, third, fourth and sixth protection films is 5 to 40 mol %.

8. The optical record medium according to claim 1, wherein said record film is made of a material which can transform reversibly between a crystalline state and an amorphous state.

9. The optical record medium according to claim 1, wherein said record film is made of a material including Te, Ge and Sb.

10. The optical record medium according to claim 9, wherein the thickness of said record film is selected between 30 and 50 nm.

11. The optical record medium according to claim 9, wherein the composition of said record film has a following value of "g" which denotes the mol ratio of $GeTe/Sb_2Te_3$:

$$1.0 \leq g \leq 2.5,$$

and a following value of "b" which denotes the mol ratio of $Sb/Sb_2Te_3$:

$$0.0 \leq b \leq 0.5.$$

12. An optical record medium comprising:
 a first protection film applied to a surface of a transparent substrate;
 a second protection film applied to said first protection film;
 a third protection film applied to said second protection film;
 a record film applied to said third protection film, said record film being able to be transformed from an amorphous state to a crystalline phase with radiation;
 a fourth protection film applied to said record film;
 a fifth protection film applied to said fourth protection film;
 a sixth protection film applied to said fifth protection film; and
 a reflection layer applied to said sixth protection film;
 wherein said first, third, fourth and sixth protection films are made of a mixture of ZnS and $SiO_2$ and said second and fifth protection films are made from a material having a larger thermal conductivity than said first, third, fourth and sixth protection films.

13. The optical record medium according to claim 12, wherein the material of said second and fifth protection films having the larger thermal conductivity is made from at least one material selected from the group consisting of $SiO_2$, AlN, $Al_2O_3$, $Si_3N_4$, SiC and $Ta_2O_5$.

14. The optical record medium according to claim 12, wherein the thicknesses of said second and fifth protection films are selected between 30 and 50 nm..

15. The optical record medium according to claim 12, wherein the total sum of the thicknesses of said first, second and third protection films is selected between 105 and 130 nm.

16. The optical record medium according to claim 12, wherein the total sum of the thicknesses of said fourth, fifth and sixth protection films is selected between 150 and 250 nm.

17. The optical record medium according to claim 12, wherein said record film is made of a material which can transform reversibly between a crystalline state and an amorphous state.

* * * * *